United States Patent [19]
Ben-Ayed et al.

[11] Patent Number: 5,218,676
[45] Date of Patent: Jun. 8, 1993

[54] DYNAMIC ROUTING SYSTEM FOR A MULTINODE COMMUNICATIONS NETWORK

[75] Inventors: Mondher Ben-Ayed; Charles W. Merriam, both of Rochester, N.Y.

[73] Assignee: The University of Rochester, Rochester, N.Y.

[21] Appl. No.: 561,538

[22] Filed: Jan. 8, 1990

[51] Int. Cl.[5] .................................................. G06F 13/372
[52] U.S. Cl. .................................... 395/200; 395/275; 364/22.9; 364/242.8; 364/230.3
[58] Field of Search .................................... 364/200, 900

[56] References Cited

U.S. PATENT DOCUMENTS

| | | | |
|---|---|---|---|
| 4,330,857 | 5/1982 | Alvarez, III et al. | 370/105 |
| 4,905,233 | 2/1990 | Cain et al. | 370/94.1 |
| 4,980,857 | 12/1990 | Walter et al. | 364/900 |

OTHER PUBLICATIONS

Philip M. Marlin, Paul J. Schweitzer, "Deadlock Avoidance in Store-and-Forward Networks-I: Store-and-Forward Deadlock", IEEE Transactions on Communications, COM 28-3, 1988, pp. 345-354.

W. J. Dally, C. L. Seitz, "Deadlock-Free Message Routing in Multiprocessor Interconnection Networks", IEEE Transactions on Computers, C36-5, May 1987, pp. 547-553.

*Primary Examiner*—Gareth D. Shaw
*Assistant Examiner*—John Q. Chavis
*Attorney, Agent, or Firm*—M. Lukacher

[57] ABSTRACT

A communication network having a multiplicity of nodes provides efficient exchange of messages between the nodes. The messages may be originated and received by the computers of a parallel computer system, the processors and associated memories of which are connected to each node. Each node includes a routing system which results in efficient system performance for the parallel computer system associated with the nodes. The messages have control information (a message tag) to which the routing system at each node is responsive. The tag contains data identifying the destination node of the message in the network and prioritization data which, when the message is generated, is initialized to have a value (weight) corresponding to the length (number of links) of the minimal path from the source node where the message originates to the destination node of the message. The routing system utilizes the weights to establish message priority. The routing system receives and sends messages not exceeding the number of links connected thereto on each cycle such that messages flow in and flow out of each routing node on each cycle without being held or stored in queues in the node. Messages of lesser priority are switched by the router to alternate links in accordance with their weights thereby dynamically routing and resolving conflicts among messages.

19 Claims, 7 Drawing Sheets

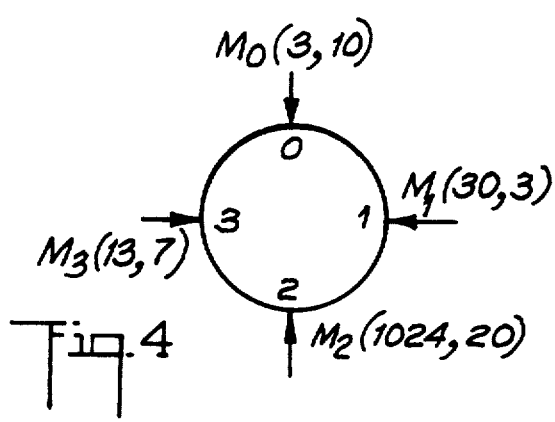
Fig. 4
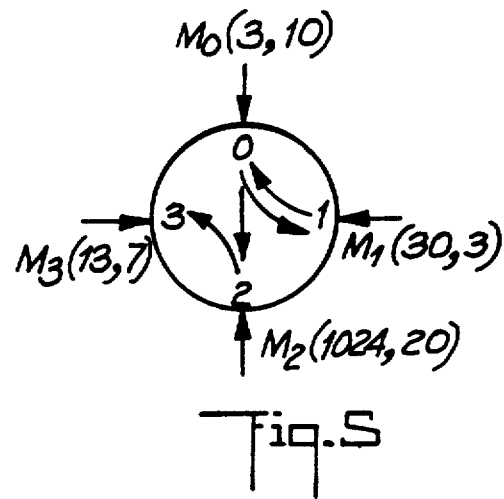
Fig. 5
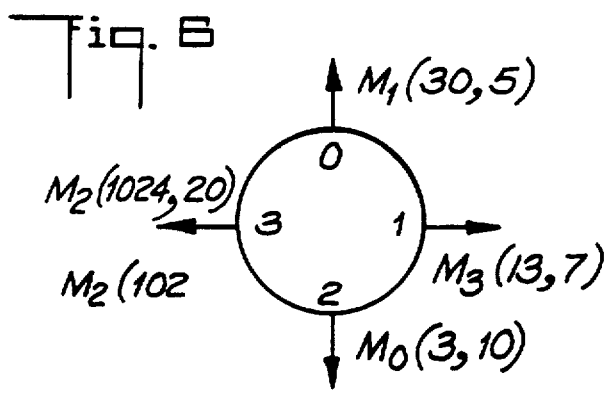
Fig. 6
Fig. 3
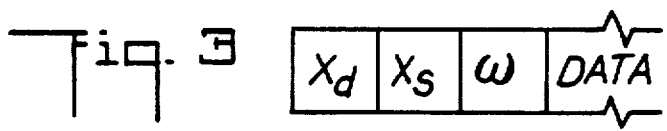
Fig. 7A
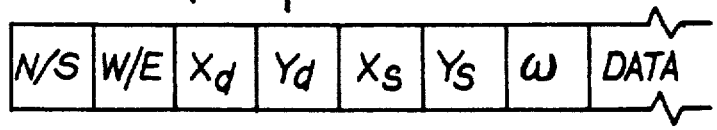

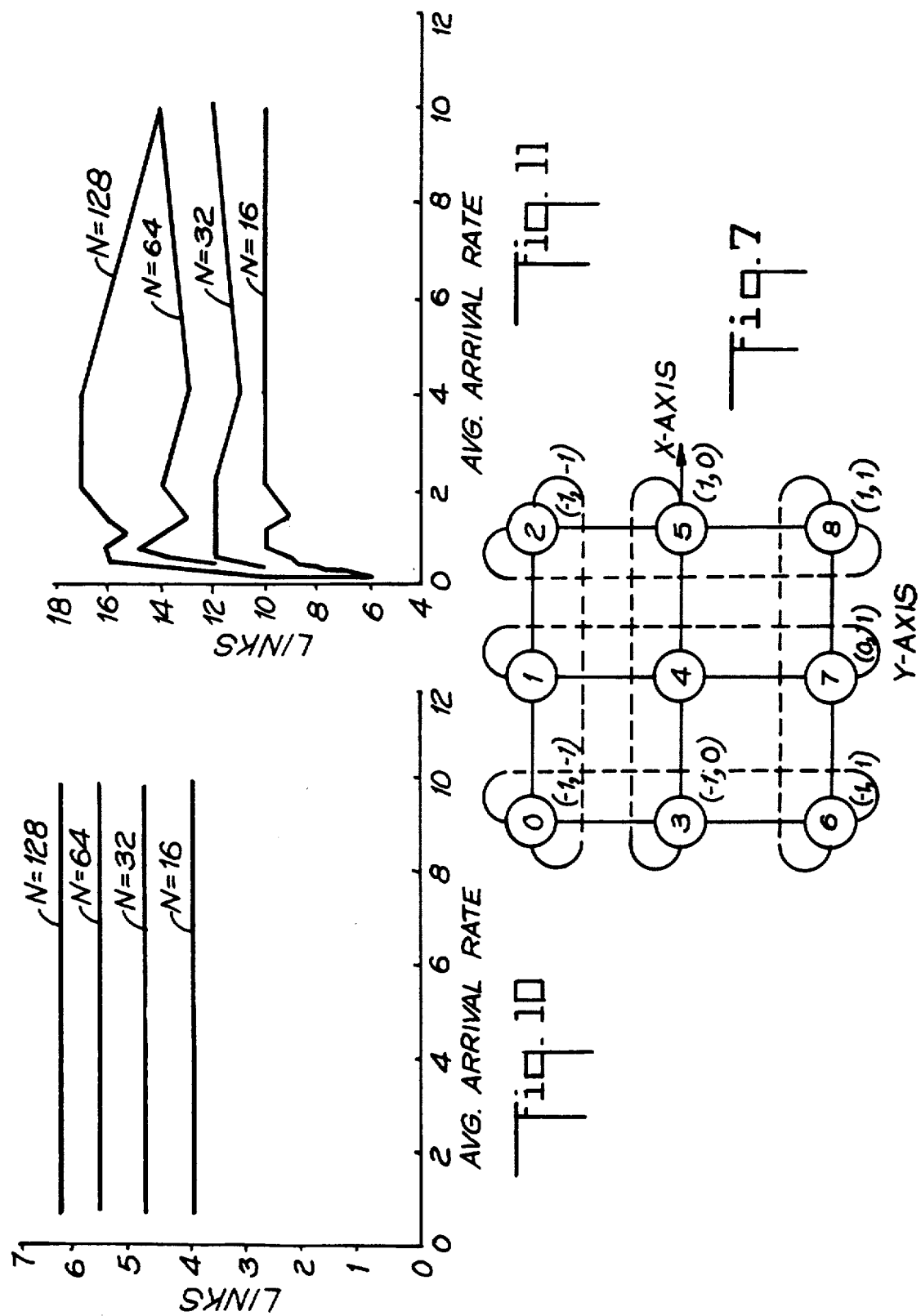

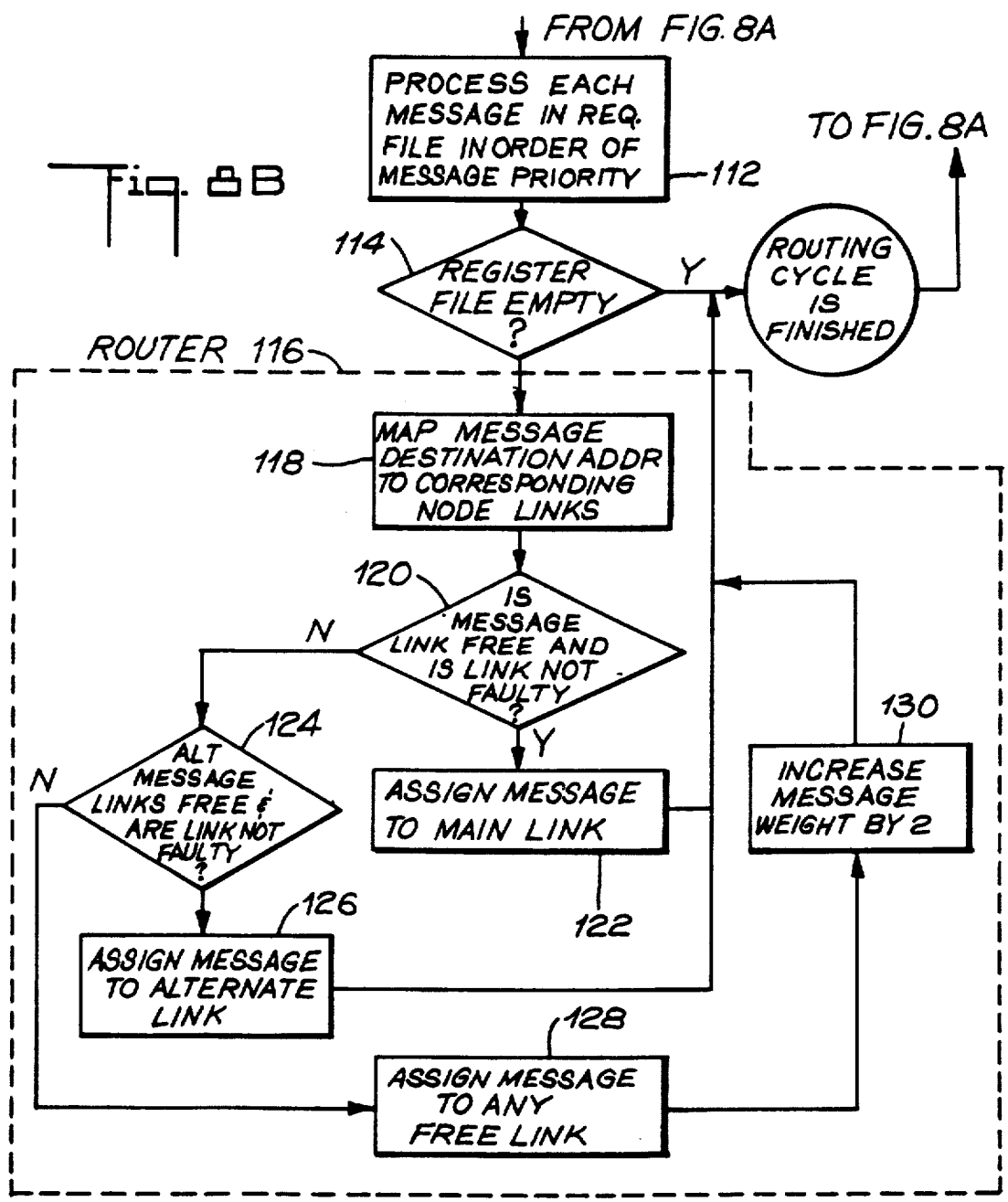

DYNAMIC ROUTING SYSTEM FOR A MULTINODE COMMUNICATIONS NETWORK

INTRODUCTION

The present invention relates to message communication systems and particularly to a system providing dynamic routing of messages between the nodes of a communication network.

The invention is especially suitable for use in multicomputer or parallel computer systems and controls the exchange of messages between various nodes in the parallel computer. The invention is generally useful in multinode communication networks for routing messages between nodes dynamically, by which is meant resolving collisions between messages by rerouting some of the messages which are subject to collisions through less congested routes in the network. Accordingly, the inventive routing system is useful in telephone switching networks and other networks for data communication, as well as in parallel computer networks. A communication network, including the dynamic routing system of the invention is capable of providing a critical component or building block of parallel computers which operate in the multiinstruction multiple data stream (MIMD) mode, as well as in the single instruction multiple data stream (SIMD) mode.

The network, including the routing system of the invention has routing nodes, also called switching nodes, which are attached to processing nodes (i.e. a computer) and is referred to as a direct network. Direct networks are also called point to point networks. Such networks are major building blocks for many SIMD and MIMD parallel computers. Such networks are called multicomputer networks because each node of the network consists of a computer or computers (i.e. a processor, a local memory and the routing system). The network itself is represented conveniently by a labelled graph whose vertices and edges correspond to routing nodes and communication links. The links may be bidirectional or full duplex. The links may be unidirectional (receive and transmit or send pairs) or half duplex. There are various network topographies or architectures, for example, the 2-D torus, hypercube networks and binary Debruijn networks. The degree of the network is the number of links per node. The diameter of the network is the longest minimal path between any two nodes in the network. The network may be regular, as in the case of the 2-D torus and hypercube, by which is meant that all nodes are of the same degree.

BACKGROUND

Multicomputer or parallel computer systems have been retarded in their use and application by limitations in systems for interconnecting and exchanging messages between the processors and the memories connected to the nodes of such systems. Interconnection networks have been very costly. It has been estimated that at least half the cost of a parallel computer system is in the area of interconnection. Parallel computer systems which have been available do not utilize more than a small number of computers due to the inability to efficiently communicate messages via their interconnection network.

In order to avoid message collisions during routing of multiple messages concurrently, conventional switching systems have buffers in each network node in which queues of messages awaiting transmission are stored. Flow control mechanisms are used in the network nodes to inform neighboring nodes of overflow conditions. Such systems then develop congestion in areas of the network, known as "hot spots" which can propagate through the network causing bottle neck and even deadlock in which message flow ceases because critical message queues are filled. When a bottleneck appears, the delay time in which a message remains in the network without reaching its destination can increase without bounds.

Techniques for message switching where the message is transmitted from node to node in its entirety and circuit switching in which a message header is sent from the source node to establish a fixed path to the destination node which is held between the source and destination nodes for as long as communication is taking place between the two nodes, have heretofore given rise to bottlenecks and deadlocks. Attempts to avoid bottlenecks and deadlocks have been based upon sorting of buffer space. See, P. Merlin and P.J. Schweitzer, "Deadlock Avoidance in Store and Forward Networks—I: Stored-And Forward", IEEE Transactions on Communications, COM 28-3 1988, pp. 345-354. A strategy in which acyclic message paths are used has been proposed as another way of avoiding deadlocks. See, W.J. Dally and C.L. Seitz, "Deadlock Free Message Routing in Multiprocessor Interconnection Networks", IEEE Transactions on Computers, C36-5, May 1987, pp. 547-553. Such routing techniques are basically static, rather than dynamic since the route is determined at the initiation point (the source node).

SUMMARY OF THE INVENTION

It has been discovered, in accordance with the invention, that messages may be dynamically routed, preferably using a minimum length path, but not necessarily along that path. The path is not predetermined. It is based upon the traffic in the network, information with respect to which is contained in the message itself by a prioritization factor or weight attached to the message. This dynamic routing system is controlled by the message thereby eliminating message queues in each network node and flow control means, which are the principal contributors to network complexity. Messages are exchanged synchronously in each cycle and their flows in equal their flows out of the nodes of the network thereby avoiding bottlenecks and deadlocks. Messages are always routed on each cycle even though they may be routed along a nonpreferred path. Such paths use under-utilized portions of the network, allowing the usage of the entire network to be maximized and minimizing the average time a message spends in the network. In other words, routing is determined in accordance with the state of the message. This enables the routing function to be distributed over all of the network nodes without the need for flow control mechanisms, especially mechanisms which control queues of messages in buffers, thereby reducing the amount of hardware and the cost of a communications network.

A parallel computer system utilizing such a network embodying the invention is therefore much lower in complexity and cost and may utilize more computers than conventional systems which rely on message queues and flow control means. In telephone communications systems, computers themselves requiring large amounts of software and data bases, are often used for flow control. In a system in accordance with the invention, messages, rather than circuits carrying the messages, are switched dynamically. Thus, all circuits are available on each message cycle, thereby increasing the utilization and therefore the performance (the time a message is delayed in the communications network) over conventional systems which allocate circuits to messages on the basis of circuit availability. The overhead necessary to monitor the circuits so that available circuits can be allocated is also eliminated.

The dynamic routing system provides fault tolerant routing in direct networks. Fault tolerant routing systems, heretofore used, have usually tended to introduce major complications in the implementation of routing nodes. However, because re-routing of messages is naturally built into the dynamic routing system, simple, fault tolerance is built into the routing system without change to the organization of routing nodes. For example, a link failure can be dealt with in a simple fashion by indicating that message buffers connected to the failing link are "full" in both routing nodes connected by the link. The "full" status of buffers corresponding to the failing link causes a message conflict whenever a router attempts to use the failing link. The router attempting to use the failing link is forced then to re-route the message otherwise assigned to the failing link on an other free link.

Accordingly, it is the principal object of the present invention to provide an improved dynamic routing system for communication networks which provides message switching without centralized flow control and routing queues, thereby eliminating the overhead needed for flow control and queues and preventing bottleneck and deadlock conditions in the network.

It is another object of the invention to provide an improved routing system in which all messages entering a routing node leave a routing node (flow in equals flow out) on each switching cycle thereby avoiding message queues in the routing node and preventing deadlock conditions.

It is a further object of the invention to provide an improved routing system for dynamically rerouting messages which may be involved in collisions through less congested nodes of a multinode communication network.

It is a still further object of the invention to provide an improved dynamic routing system which is non-blocking in operation.

It is a still further object of the present invention to provide an improved dynamic (collision avoidance) message routing system in a multinode network which eliminates routing queues in the nodes and reduces communications overhead by eliminating the need for buffer management and message flow control by dynamically rerouting messages based upon the message pattern (traffic) in the network, information with respect to which is contained in the messages which are switched by the routing system.

It is a still further object of the present invention to provide an improved distributed message routing system wherein switching of messages is determined locally at each network node, independently of the condition of other nodes of the network.

It is a still further object of the present invention to provide an improved system for routing messages between the nodes of a multinode data communication network in accordance with the minimal path (shortest distance from a source node to a destination node) and a prioritization factor (weight) which depends upon whether the message has been rerouted on a free link of the network which is not along a path of minimal length for the message.

It is a still further object of the present invention to provide an improved routing system for use in a multinode data communications network in which routing is determined exclusively by the state of parameters local to the node without central control which requires routing at each node to be determined by a central controller which has access to the entire state of the switching network.

It is a still further object of the invention to provide an improved direct multicomputer network having routing nodes associated with processing nodes.

It is a still further object of the present invention to provide an improved distributed message routing system in each node of a multinode data communications network which is synchronous in operation, but which can input and output messages (for example, to processors associated with each node) asynchronously.

It is a still further object of the present invention to provide an improved distributed message routing system for use in a multinode data communications network which simplifies the design and lowers the cost of such networks by eliminating message buffers containing queues of messages and flow control computers for managing the flow of data into and out of such buffers.

It is a still further object of the present invention to provide an improved dynamic message routing system suitable for use in multiple computer networks having various network topographies (i.e., is topology independent) such as 2-D torus, hypercube and Debrui networks.

It is a still further object of the present invention to provide a dynamic message routing system which is fault tolerant and automatically re-routes in the event of a link failure.

Briefly described, a dynamic message routing system in accordance with the invention, can be used in each node of a multinode network wherein each node is connected to the other nodes of the network by a plurality of message communication links. The nodes can also contain means for generating and receiving messages, such as the processors and memories of a multiprocessor or parallel computer system, which are interconnected for message exchange by the network. The routing system is operative for transferring messages from node to node. The messages are emitted by the processors, which are the sources of the messages, and are sent to nodes associated with the processors which are the destinations for the messages. The system enables messages to move continually on successive cycles among the nodes without being blocked at any node and while minimizing the average time spent by messages in travelling between their source and destination nodes regardless of the distance and the number of such links between the source and destination nodes. The routing system utilizes means for routing the messages along links of minimum length to reach their destination nodes and along other links with priority given to the messages having the longest distance between their source and destination nodes. The system also includes means for increasing the priority of the messages each time they are routed on links which are along paths of more than minimal length. The system includes means at each node for sending and receiving a number of messages not exceeding the number of links connected to each node.

BRIEF DESCRIPTION OF THE FIGURES OF THE DRAWINGS

The foregoing and other objects, features and advantages of the invention, as well as a presently preferred embodiment thereof, and the best mode now known for carrying out the invention, will become more apparent from a reading of the following description in connection with the accompanying drawings in which:

FIG. 3 is a diagram illustrating a message and particularly the control information or message tag portion thereof;

FIG. 4 diagrammatically shows a routing node and indicates the messages received prior to rerouting by the node;

FIG. 5 is a diagram similar to FIG. 4 which illustrates the directions in which the messages are switched on rerouting;

FIG. 6 is a diagram similar to FIG. 4 showing the outgoing messages which are transmitted on the links associated with each routing node;

FIG. 7 is a schematic diagram of a 2-D torus multinode network having nine nodes, each of which may be a node similar to that shown in FIGS. 1 and 2 and which is used in a specific example of dynamic, distributed message routing in accordance with the invention which is presented below;

FIG. 7A is a diagram illustrating a message routed in the network of FIG. 7;

FIG. 9, which is also in two parts labelled

FIG. 10 is a graph illustrating the performance of multinode networks, having different numbers of nodes and different numbers of links, in terms of average arrival rate of the messages at each node (lamda) for average final path lengths for message routed through the network; and FIG. 11 is another set of performance curves similar to FIG. 10, but for a worse case condition simulating longest path lengths through the networks.

DETAILED DESCRIPTION

Further information with respect to the present invention and various examples of the implementation thereof in various network topographies will be found in a thesis entitled "Dynamic Routing For Regular Direct Computer Networks" by Dr. M. Ben-Ayed, one of the inventors hereof which was supervised by Dr. C.W. Merriam, the other of the inventors hereof. This thesis is available at the University of Rochester, Rochester, New York, USA. The material in the thesis and further information and references to prior work in the area of multiprocessor networks which contains much of the information in the thesis, as well as the results of performance modeling for the routing system described herein is the subject matter of an article by M. Ben-Ayed and C.W. Merriam entitled "Performance Evaluation and Modeling For Dynamic Routing in Direct Multicomputer Networks" which is contained in the Proceedings of the 23rd Annual Hawaii International Conference on System Sciences, Jan. 2-5, 1990 and is available from the IEEE, Computer Society Press. A copy of the article has been filed with this application in the United States Patent and Trademark Office.

Figure 1:
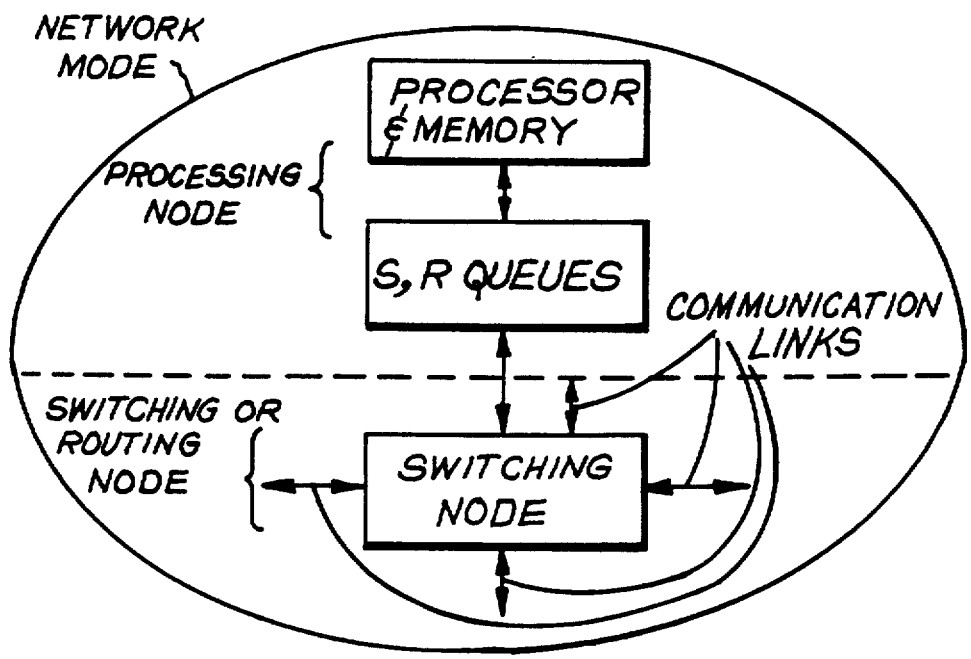
FIG. 1 is a diagrammatic view of a network node which be one node of a multinode data communications network of a multiprocessor.

Referring to FIG. 1, there is shown, generally, a network node which may be identically reproduced at each of the nodes labelled 0-8 of the 2-D torus multinode network shown in FIG. 7. Each node consists of a processing node portion and a switching or routing node portion. The dividing line between the nodes is indicated by the dash line. The processors and memories of each network node may be parts of a multiprocessor or parallel computer system. Communication between the routing node and the processor and its memory are through send (S) and receive (R) queues. Each S and R queue pair is a buffer having two unidirectional queues which are an integral part of the processing node. The send and receive queue buffers are illustrated in greater detail in FIG. 9A. These queues partially decouple operation of the routing network from the operation of the processing nodes so that concurrent processing and routing are semiautonomous. The queues allow the operation of the communications network and the operation of the processing nodes to be asynchronous. The routing nodes in the network exchange messages synchronously according to a clocked routing cycle. The clock and its connections to the switching or routing nodes is not shown to simplify the illustration. New messages are accepted from the send queues at the start of a routing cycle whenever a communication link is available. The network, therefore, has a maximum communications capability equal to the number of communication links in the network, i.e., the communications network handles a number of messages equal to the number of links in the network on a non-blocking basis without bottlenecks or deadlock. In the case of the 2-D nine node torus, there are four communication links associated with each routing or switching node and these communication links are each connected to another of the network nodes as is illustrated in FIG. 7.

Figure 2:
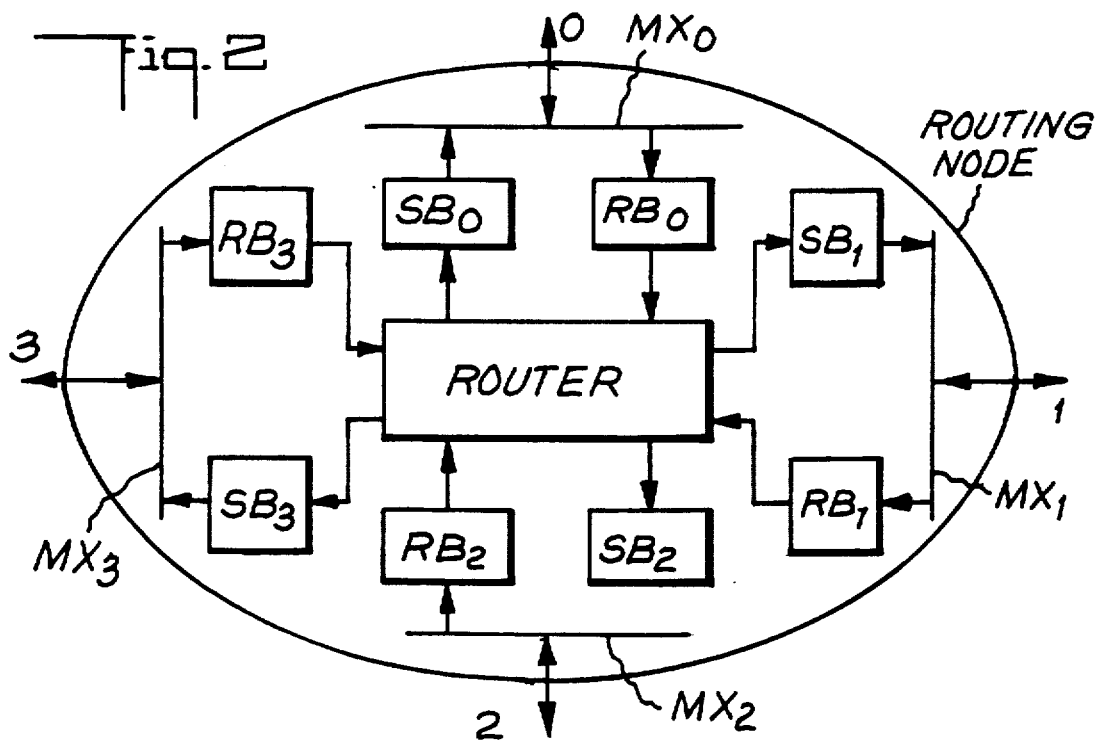
FIG. 2 is a block diagram generally illustrating the switching or routing node of the network node shown in FIG. 1.

Referring to FIG. 2, the four communication links are labelled 0, 1, 2 and 3. They are connected via multiplexers $MX_0$, $MX_1$, $MX_2$ and $MX_3$. Two paired message buffers $RB_0$ and $SB_0$, $SB_1$ and $RB_1$, $RB_2$ and $SB_2$, and $RB_3$ and $SB_3$ connect each link to a router of the routing or switching node. FIG. 2, therefore, illustrates the general internal organization of the routing nodes of each network node which in this illustration has a degree of four. The first character of the labels of the buffers indicates whether the register is connected to an incoming receive or an outgoing send link. The router determines where each received message is going to be routed during the next routing cycle. The message buffers are of unit message capacity and all messages entering the node on a given routing cycle leave the routing node on the next routing cycle. In other words, the messages flow in and flow out of the node and the node has a "flow out equal flow in" property. The multiplexers show that the links are full duplex. It will be appreciated that half duplex links, each with two wires, for sending (transmitting) and receiving (inputting) messages to the node may be used.

All messages in the network have equal message length, and every receive buffer (RB) and send buffer (SB) is capable of storing a single message. The messages are routed on each routing cycle. Routing is synchronous and messages are exchanged synchronously on each routing cycle. There are no message queues in the routing nodes.

The 2-D torus or toroidal mesh has a regular and symmetrical topology as shown in FIG. 7. Because this network is a direct network, its nodes represent processing elements and memory nodules as well as routers. The diameter of 2-D torus network is equal to $N^{\frac{1}{2}}$ where N is a perfect square, and N is the number of nodes in the network. The case considered here is where N is the square of an odd number, because routing is easier in the 2-D torus when the torus has a node in its center. The network has a constant degree equal to 4, and 2N links. These links allow multiple optimal routes between most nodes and many non-optimal routes between any two nodes. To be specific, consider a source node S and a destination node D which is (x+y) links away from S (i.e. x is the number of horizontal links separating S from D, and y is the number of vertical links separating S from D), then there are $(x+y)!/(x!y!)$ possible distinct paths of minimal length between S and D. Also, the mean nodal distance for a 2-D torus network with N nodes is $(N-1)/(2N^{\frac{1}{2}})$ for all equiprobable pairs.

A most common method for labeling a 2-dimensional grid (i.e. a mesh or a torus) is by the use of row-major indexing of the nodes. For the purpose of routing, however, a more convenient method is to label each node by a pair of integers (x,y) which corresponds to coordinates of the node when the torus is embedded in a Cartesian coordinate system. Inequalities $-(n-1)/2 \leq x, y \leq (n-1)/2$ hold where $n=N^{\frac{1}{2}}$. The 2-tuple (x,y) assigned to node $n_i$ (i.e. is the index of the node when row-major indexing is used to label the nodes) is defined by:

$$x = -(\sqrt{N} - 1)/2 + i \bmod \sqrt{N} \tag{1}$$

and $$y = -(\sqrt{N} - 1)/2 + i \operatorname{div} \sqrt{N}$$

The message tag for the routing algorithm in the example of FIG. 7A is defined as shown in FIG. 7.

i) N/S is a 2-bit field which is interpreted as:
  If N/S=2, then the message cannot be routed along the optimal north/south direction.
  If N/S=1, then the message can be routed in the optimal north direction.
  If N/S=0, then the message can be routed in the optimal south direction.
ii) W/E is a 2-bit field which is interpreted as:
  If W/E=2, then the message cannot be routed along the optimal west/east direction.
  If W/E=1, then the message can be routed in the optimal west direction.
  If W/E=0, then the message can be routed in the optimal east direction.
iii) ($x_d$, $y_d$ is the coordinate-pair of the destination node of the message.
iv) ($x_s$, $y_s$) is the coordinate-pair of the source node of the message.
v) w is as defined the discussion of FIG. 3 below.

The first step in routing a received message defines directions of the links which correspond to one of the possible message paths with minimal length. This step results in the assignment of values to fields N/S and W/E in the tag of a received message. This step is performed simultaneously for each of the four possible received messages.

Consider, for instance, the node with coordinates (0,0), then the N/S and W/E fields of the tag of any message in node (0,0) is given by N/S=sgn($y_d$) and W/E=sgn($x_d$) if $x_d=0$ and $y_d=0$ hold. Otherwise, W/E=2 if $x_d=0$ holds and/or N/S=2 if $y_d=0$ holds. Every node north of (0,0) has a negative y-coordinate, and every node south of (0,0) has a positive y-coordinate. Moreover, every node west of (0,0) has a negative x-coordinate, and every node east of (0.0) has a positive x-coordinate. Sign bits of the coordinates of the destination node for a given message in node (0,0) exactly correspond to the definition of N/S and W/E fields in the message tag. In the special case where $x_d$ and yd are both 0, then the node absorbs the message into its R queue. Moreover, if either $x_d$ or $Y_d$ is 0, then the message can be routed along only one minimal path. Equalities N/S=sgn($y_d$) and W/E-sgn($x_d$), if $x_d=0$ and $y_d=0$, do not hold for any node in the network other than node (0,0). For example, node $(-2,-2)$ in a $7\times7$ 2-D torus has both northern and southern adjacent nodes with negative $y_d$ coordinates (i.e. node $(-2,-3)$ and node $(-2,-1)$ respectively). Thus, condition N/S=sgn($y_d$) does not hold. Because of the rotational periodicity of the 2-D torus, however, any node $(x_o, y_o)$ in the network can be mapped to node (0,0) by vertical and horizontal rotations. Correspondingly, the destination $(x_d, y_d)$ of a message M, which was received by node $(x_o, y_o)$ in the previous network cycle, is mapped to $(x_d', y_d')$ using equation (2). As a consequence of this mapping, N/S of M is equal to sgn($y_d'$) and W/E of M is equal to sgn($x_d'$) when $x_d'=0$ and $y_d'=0$. Otherwise, W/E=2 if $x_d'=0$ holds and/or N/S of M=2 if $y_d=0$ holds.

$$\text{if } x_d' < -[(\sqrt{N} - 1)/2], \text{ then } x_d' = x_d' + \sqrt{N} \tag{2}$$

$$\text{if } x_d' > [(\sqrt{N} - 1)/2], \text{ then } x_d' = x_d' - \sqrt{N}$$

and $$\text{if } y_d' < -[(\sqrt{N} - 1)/2], \text{ then } y_d' = y_d' + \sqrt{N}$$

$$\text{if } y_d' > [(\sqrt{N} - 1)/2], \text{ then } y_d' = y_d' - \sqrt{N}$$

The second step in routing a received message during a network cycle consists of assigning that message to a particular send register (SB-FIG. 2) (i.e. a register interfaced to an outgoing link). There are two possibilities corresponding to the case where there are not conflicting messages in the node and the case where there are some conflicting messages in the node. These cases are treated as follows.

In the case of non-conflicting messages, suppose node $n_i$ has received a message M. After an origin transformation is performed on the coordinates of the destination of M, the router then assigns M to a communication link just by inspecting the values of the W/E and N/S fields of the tag of M. The assignment is accomplished by the following convention:

If message M can be routed optimal in only one direction, then either N/S=2 or W/E=2 must occur. Specifically, assignment West-Send-Register←M is made when N/S=2 and W/E=1 hold, whereas assignment East-Send-Register←M is made when W/E=2 and N/S=0 hold. Alternatively, assignment North-Send-Register←M is made when N/S=2 and W/E=1 hold, whereas assignment South-Send-Register←M is made when N/S=2 and W/E=0 hold.

In case of conflicting messages, if, on the other hand, message M can be routed in either of two possible directions, then the router attempts to route M along its north/south direction if the corresponding send register is empty. Otherwise, the router assigns M to either West-Send-Register or East-Send-Register depending on the value of the W/E field in the stage of M. The choice of first using the north/south direction is adopted by convention. Thus, north/south axis is called the preferred direction of the message, and the east/west axis is called the alternate direction.

In order to distinguish between messages which are to be routed optimally and those which are being delayed, a prioritization mechanism is invoked by the routing system. Specifically, the set of received messages first is ordered according to the value of the w field of each message-tag. Then, the message with the highest value of w is granted first choice of routes. In case two messages have the same w field value one of these messages has only one optimal path (i.e. N/S=2 or W/E=2), then the message which has only one optimal path is assigned a higher priority.

Consider routing a particular message M after the prioritization phase of the routing system is done. First, an attempt is made to route message M along its preferred direction. However, if the preferred direction of message M is not free because a message with a higher priority has already been assigned to that particular direction, then an attempt is made to route message M along its alternate direction. Finally, if neither the preferred nor the alternate direction of message M is available, then message M is assigned, by convention, to a free link in the south, north, west, or east direction, whichever is available first in accordance with this order. Such a link must be free in accordance with the "flow-out=flow-in" property of each routing node, and use of this link results in rerouting of message M. Whenever a message is rerouted and hence delayed, the value of the w field of its tag is increased by two.

The following program in "C" language summarizes routing functions performed by each network node during each network cycle:

```
Route (M) MESSAGE M; {
    int ROUTED_FLAG = 0;
    if (N/S==2 and W/E==2) { absorb(M); return }
    switch (N/S) {
        2:break;
        1:ROUTED_FLAG=send_north(M);
        break;
        0:ROUTED_FLAG=send_south(M);
        break;
    }
    if (ROUTED_FLAG) return;
    switch (W/E) {
        2:break;
        1:ROUTED_FLAG=send_west(M);
        break;
        0:ROUTED_FLAG=send_east(M);
        break;
```
```
    }
    if (ROUTED_FLAG) return;
    send_south_north_west_east(M)
```

Referring next to FIGS. 3–6 the logic or algorithm which is carried out by the router of each switching node will become more apparent. The control information is carried by a message tag which may be a header or otherwise embedded in the message with the data of the message. The message is of course in digital (preferably binary) form. The control information identifies the destination node and $x_d$ is the label of the destination node. The node where the message is injected, for example from the send queue of the processing node is $x_s$. Both $x_d$ and $x_s$ are multi-bit codes having sufficient bits to identify all of the nodes of the multi-node network. For example, $x_d$ and $x_s$ may each be four-bit signals for the 2-D torus network shown in FIG. 7. The source node identification, $x_s$, is not used in routing but is desirable for other purposes, for example in acknowledging received messages, conventional acknowledgment techniques may be used for such purpose. $x_s$ therefore designates the node where the message is injected into the communications network.

Omega (i.e., $\omega$) is the weight of the message and indicates initially the minimal path length (the number of communication links) between the source and destination nodes. The number of bits of the omega portion of the tag is the worst case path. The value of omega therefore depends upon the network topology. This value is generated in the processor and applied to the message together with $x_d$ and $x_s$. Simulation results for various networks indicate that the longest path used by any message has a length of less than three times the diameter of the network. The diameter of a network was defined above. In a direct network the diameter equals the largest of minimal path lengths between any pair of nodes and is denoted generally by k. An error condition exists when the value of the weight field, omega, exceeds an upper limit. Then the message is removed from the network even though it may not have reached its final destination (i.e. routing of the message is aborted). Premature removal of a message from the communications network occurs with an extremely small probability, because prioritization used for rerouting minimizes the length of the longest path being used by messages currently being routed. The $x_d$, $x_s$, omega and data fields of the message are created in the processor depending upon the topology used for the communications network. The initial value of omega is the length of the minimal path (the minimal number of links which the message can take in going between its source and destination node. A table in the form of memory or combinational logic provides the initial value of omega in each message. The state of the message is represented as $M(x_d, omega)$. The current value of omega may change and the value increases if the message is rerouted along a path of less than minimal length the routing is distributed because routing decisions are based on the state of the message. Each node operates locally since the weight changes when a message is rerouted to avoid collisions the routing is determined in part by message traffic in the network. It will be seen that the routing algorithm is self-routing and dynamic and message paths are established in a distributed manner during routing. The results presented below show that the overall performance of the communication network is improved using dynamic routing. It will also become apparent that injection of a new message into the network from a processor at a network node only requires the availability of a free-link (one of the receive buffers, (RB$_2$) in the respective routing node.

In the exemplary case shown in FIG. 4 there are four messages, M$_0$, M$_1$, M$_2$ and M$_3$. The state of messages ($x_d$, omega) is shown next to the message label. As noted above the weights may be computed in the processor. Alternatively, the weights can be computed in the router when the message is received. In the routing system, the first step is the identification of minimal "directions". The set of outgoing links which correspond to message paths of minimal length are identified in the router. This step is preferably accomplished through a transformation involving the destination address of the message and the address of the routing node where the decision is made (i.e. the source node or whatever node the message happens to be at in the process of being routed). The hardware to accomplish this identification may involve combinational logic which identifies the one of the four links which is along a path of minimal length in accordance with the network topology. Alternatively, table look-up may be used. Combinational logic to provide a transformation is more desirable when practical, however since such logic operates at higher speed than table look-up processes. The next step is prioritization of routes for message conflicts. Such prioritization avoids the need for queues in which messages are stacked in the routing nodes. Next, a main outgoing link for each message and also an ordered list of alternate outgoing links is generated. In case of no message conflicts, the message is always routed on this main link. When a message conflict does occur an attempt is first made at rerouting blocked messages on one of their respective alternate links which correspond to a path of minimum length, if such link is free. If a conflict does occur the step of prioritization of routes for message conflicts is carried out. Message conflicts are resolved by rerouting in accordance with message priority. Initially, the set of received messages (e.g. M$_0$–M$_3$) is sorted in descending order of current path length (i.e., the omega field in the message's tag). The message with the largest value of omega is assigned the highest priority and so on. Then, each message is routed first to its main outgoing link or second to one of the alternate links. However if the main and alternate links are assigned for other messages with higher priority (i.e. messages with higher values of omega) then the message is assigned to a free link which does not correspond to one of the minimal paths of the message. When a message is rerouted its weight, omega, is increased by two. A value of two is used to increase the message weight so as to reflect the increase in path length. Since a rerouted message increases in weight, its priority will ultimately increase. The routing system carries out a "min-max" process. Looking first for the minimal path and then giving priority to the message of highest weight (i.e. the message which has the longest distant to go to its destination). The message with highest weight received at a node is not rerouted but is switched to an output link along the path to its destination which is of minimal length. If rerouting is necessary, messages with lower weight than the highest weight message are rerouted. The system thus reroutes messages which can afford to be delayed (usually messages which only have one or two links distance to travel to get to their destination). The system converges so that the average delay of a message in the network is minimized. In the simple case illustrated in FIGS. 4–6, the first step is carried out by defining the main and alternate links of minimal length. For example the transformation or table look-up results in M$_0$ having two alternate links 3 and 2, M$_1$ link 3 only, M$_2$ link 3, and M$_3$ link 1. The messages are then sorted in descending order of weight. The message with the highest weight gets the first choice and so on. In this example M$_2$ (main link 3) has a weight of 20 and leads the list. Next M$_0$ which has main and alternate minimal links 3 and 2 and a weight of 10. Then M$_3$ whose minimal link is 1 with a weight of 7 and finally M$_1$ whose minimal link is 3 with a weight of 3. The switching connections are indicated in FIG. 5. M$_2$ is routed to its main link 3. Link 3 is then occupied. Then M$_0$ is routed on its alternate minimum path link 2. M$_3$ is routed on its main link 1. There is a conflict because the link selected for M$_1$ is already occupied by M$_2$. M$_1$ is then routed on the available free link which is link 0. The weight of M$_1$ is increased from 3 to 5. The output messages and there respective lengths are shown in FIG. 6. In the operation of the router messages flow in and flow out on the same cycle. They do not remain stacked in queues in the routing link. There is no need for flow control mechanisms for controlling the queues or selecting circuits depending on network conditions. The state of the message is used so that each router operates as a distributed component and has its own logic. Of course the logic of the routers at each node is replicated and may be identical.

By way of example the programming for carrying out the above algorithm for the 2-D torus communication network shown in FIG. 7 is considered next.

Figure 9A:
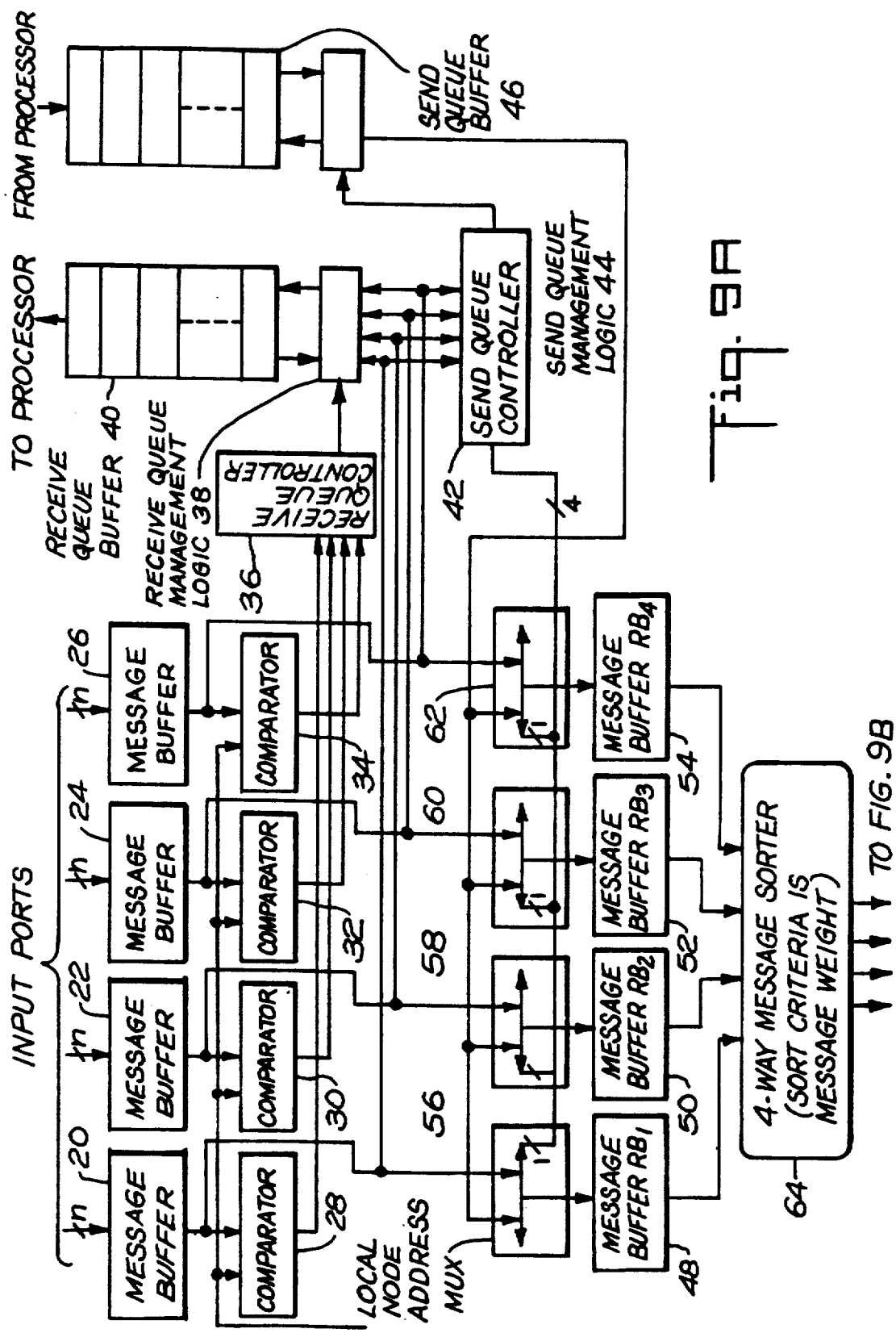
FIGS. 9A, and 9B, is a block diagram of an exemplary network node without the processor and memory thereof, which network node embodies a routing system in accordance with the invention.
Figure 9B:
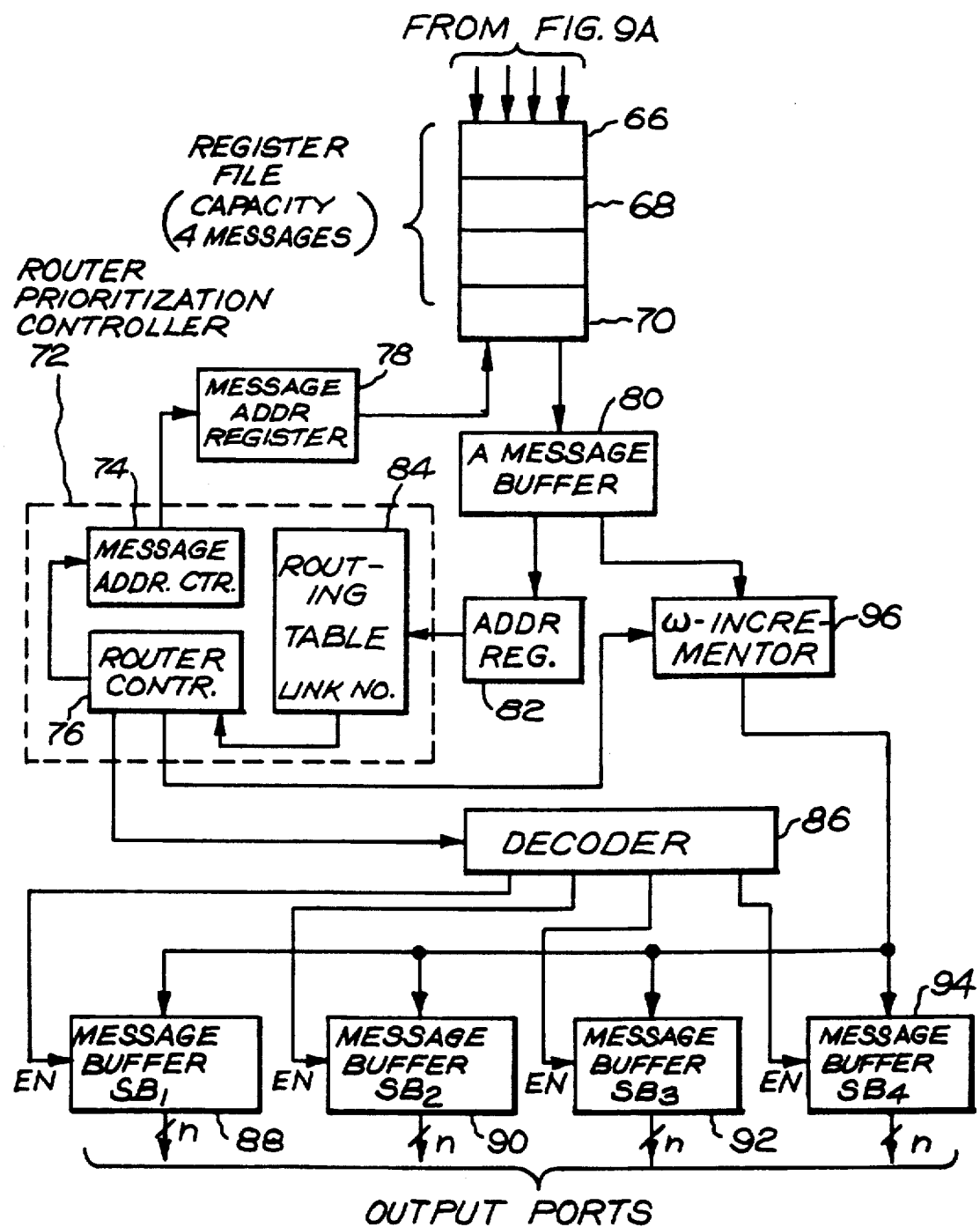

Referring next to FIGS. 9A and 9B, there is shown in greater detail the routing node illustrated in FIG. 2 and in addition, the send and receive queues (buffers) of the processing portion of the node and the control logic therefor. This control logic includes message buffers 20–26 which hold n bits of the message (the tag fields and the data field). The local node address (the label identifying this node) is compared with the destination fields of the messages in comparators 28, 30, 32 and 34. The comparators are connected to a receive queue controller 36. The controller operates receive queue management logic 38 which routes messages for this local node when the local node addresses are the same as the destination labels ($x_d$) by enabling the messages to be transferred from the message buffers 20 to 26 into the receive cue buffer 40.

The messages are inserted in the receive queue buffer one at a time at the processor clock rate which may be harder than and different from the clock rate of the routing node.

The incoming messages are also received in a send queue controller 42. This controller receives the messages and counts them. It also counts whether a message has been removed since it was addressed to the local node and placed in the receive queue buffer. An output from the receive queue controller 36 to the send queue controller provides this information. The send queue controller 42 operates send queue management logic 44 which addresses the send queue buffer 46 and extracts new messages so that they can be injected in free receive message buffers RB$_1$, RB$_2$, RB$_3$, RB$_4$ which are labelled 48 to 54 in FIG. 9A. Multiplexers 56 through 62 are controlled by the send queue management logic and connect the message buffers for messages which are not addressed to this local node to their respective receive message buffers. The free message buffers receive new messages from the send queue buffer 46 via the multiplexors 56 through 62. All of the hardware above the message buffers 48 to 54 is contained in the processing portion of the node. The remaining hardware is contained in the switching or routing portion of the network node. In the routing portion, the messages in the message buffer are presented to inputs of a 4-way message sorter 64. This sorter may be a comparator tree which compares the weights and using the weights as a criteria, inputs the messages into a register fill 66 having four message slots in order of the value of the weights of the messages. For example, the upper slot 68 may contain the message of highest weight, while the lower slot 70 contains the message of minimum weight value.

The router has a prioritization controller 72 with a message address counter 74. A router controller 76 during each routing cycle, steps the address counter through four successive counts. On each count, a parallel output from the address counter stores addresses in a message address register 78. The first count stores an address corresponding to the slot in the register 66 where the message of highest weight is located. This is slot 68. Then, this message is read out into a message buffer 80. While the message is in the message buffer, the designation node label ($X_d$) is read into an address register 82. This address register addresses a routing table which reads out the link number (of the four links) connected to the routing node. If higher speed operation is desirable and if the communications network is relatively simple, a combinational transformation logic may be used to generate the link number for the destination address of the message. This link number is then forwarded to the router controller which has memory for keeping track of the links which have been assigned. The router controller 76 operates a decoder 86 which generates enable inputs to the send message buffers $SB_1$ through $SB_4$. These send buffers are designated by reference numerals 88 through 94 in FIG. 9B. The message is applied to the message buffer for the selected link via a weight incrementor 96 which may be an adder which increments the weight field of the message by two when enabled. The weight incrementor will not be enabled when the highest weight message is routed by the router controller to its main link because that link is a link along a path of minimal length. However, as the subsequent messages from the lower slots are successively applied to the prioritization controller 72, they may be allocated to alternate links along paths of minimal length, in which case the weight incrementor will not be enabled or rerouted to free links which are not along a minimal length path for the message. Then and only then is the weight field of the message incremented. The messages are routed and remain in the send buffers. On the next cycle, these messages are presented to the nodes at the ends of their communication links. Each of these nodes has a router of identical design as shown in FIG. 9A and 9B. The messages are then transferred to the receive queues, new messages added and four messages are permitted to flow in for routing. These messages then flow out on the next cycle.

Figure 8A:
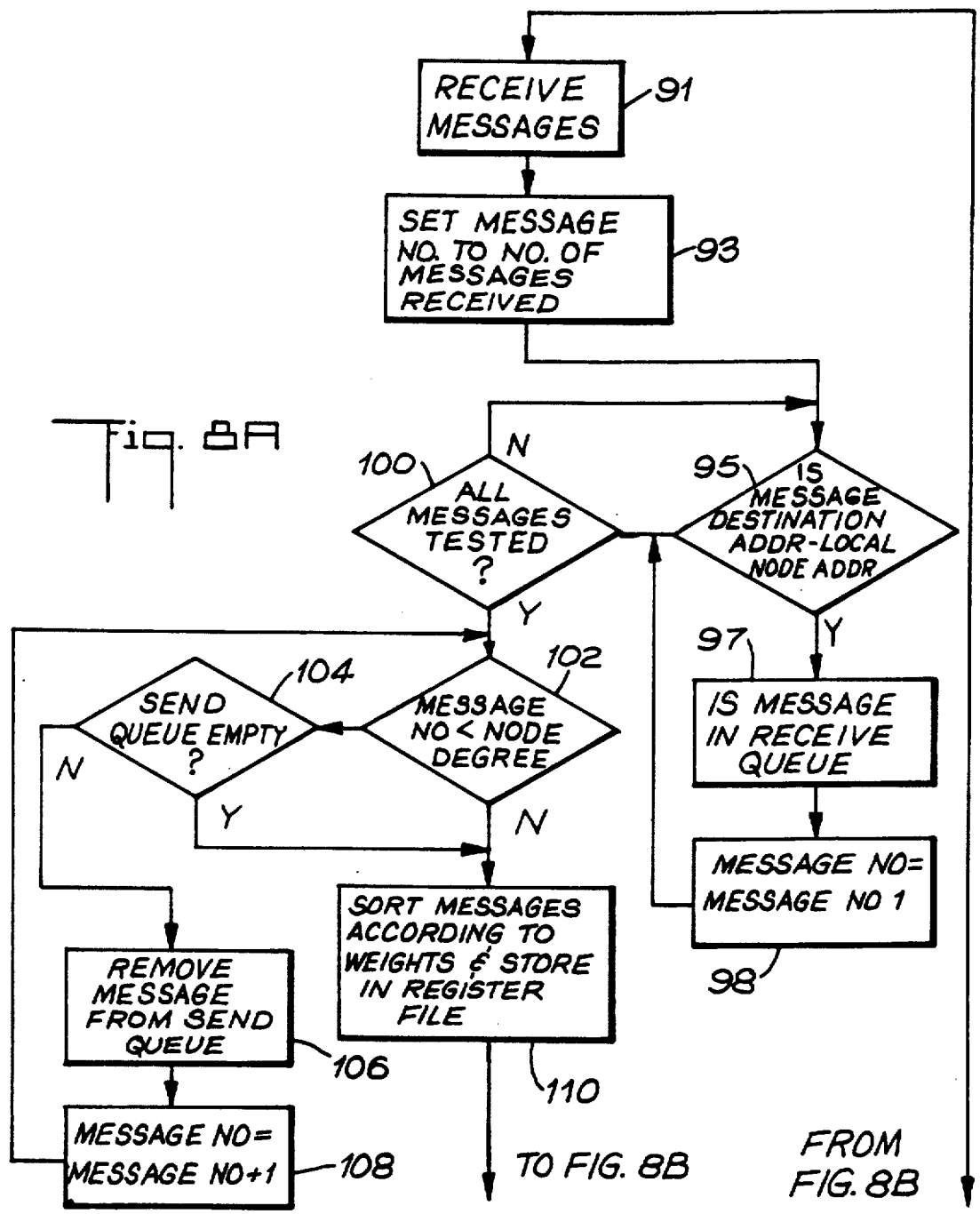
FIG. 8 is a flow chart illustrating the programming of a routing system embodying the invention (FIG. 8 is presented in two parts labelled FIGS. 8A and 8B.

The flow chart of FIG. 8 defines the programming of the send and receive queue operations and the router which may be implemented in a computer (such as a VLSI chip) which is programmed to provide the controllers and sorter and even the comparators of the system illustrated in FIGS. 9A and 9B.

The first process 91 in the routing cycle is the receiving of messages at the input ports. The next process 92 is to count the number of messages received. This process involves setting a message number to equal the number of messages received. The comparators then decide for each message if the destination address ($X_d$ of the message is equal to the local node address). This decisional process is indicated at 94. If the message's destination address is the address of the local node, the message is inserted into the receive queue as indicated at 96. The message number is decremented as shown at 98 to keep track of the number of messages being received. If all four messages are tested, the program proceeds to add messages in the space of free input links. If all messages have not been tested, the next message in the group is then examined to determine if it goes to the receive cue of the processor associated with the node.

The test message decision process 100 operates on the basis of the message number. If that message number is decremented to zero, all messages have been tested.

The next decision as shown at 102 is made on the basis of whether the message number is less than the node degree. It will be recalled that the node degree is the number of communication links associated with the node which was four in the foregoing example. If the message number is less than the node degree, another decision as indicated at 104 is required in order to determine if the send queue is empty. If the send queue is empty, there are no more messages to route through this queue. If the send queue is not empty and the message number is less than the node degree, the process 106 for removing a message from the send queue is performed. The message number is then incremented. Accordingly, messages are injected from the send queue to utilize all of the communication links if such messages are available.

The next process 110 is the sorting of the message in accordance with the message weights and the storage thereof in the register file in order of their weights. Each message in the register file is presented for routing in order. The messages are removed from the file as shown in process 112 one at a time until the register file is empty as indicated by the decision 114. Once the register file is empty, the routing cycle is finished because there are no more messages to route.

Each message is routed in the router process indicated by the block 116 defined by the dash lines. For each message in the register file, the message destination address ($X_d$) is mapped to the corresponding node links (i.e., the node links for the minimum length path to the destination node). This process is indicated at 118. The routing process continues by deciding if the main message link is free, and not faulty, which will always be the case for the first message process since it is of maximum weight. A faulty link is indicated by a buffer full condition (of the SB buffers 88 to 94 FIG. 9B) which is detected by the router logic (76 FIG. 9B). If the main or minimum path link is free, the message is assigned thereto as indicated by block 122. The decision to determine whether the main message link is free is indicated by the block 120 which causes switching over routing to alternate message links if they are free and not faulty. This is indicated by the decisional process 124. If the alternate links which are also of minimum length are free, the messages are assigned to the alternate link. If they are not free, the message is assigned to any free link as is indicated by the block 128. Then, the message weight so assigned to any free link is increased by two as indicated by process 130. If all messages available can be assigned to the main link as indicated by block 124, or to alternate links as indicated by the block 126, or whether assigned to the free link, that ends the routing cycle. The messages are then switched to the appropriate link for routing by other nodes in the communication network.

Analytical modeling and simulation of the routing system described above has been modeled and simulated for a variety of direct network topologies in the MIMD mode. In such modeling, interarrival times between messages at each node are assumed generated by an exponential distribution within an average arrival rate of lamda messages per network cycle. Another assumption is that the destination addressed of the messages issued by each node are generated by a uniform distribution. Two characteristic modes of operation corresponding to lamda greater than $lamda_c$ and lamda equal or less than $lamda_c$ are modeled. $Lamda_c$ is the value of lamda where the network which reaches near full capacity and hence, saturates. The derivation of $lamda_c$ is discussed more fully in the above referenced article by N. Ben-Ayed and C.W. Merriam. The model also indicates all performance parameters reflect saturation of the network when lamda equal or greater than $lamda_c$ holds. The simulation results indicate that all statistical parameters taken into consideration are well behaved (i.e., monatomic, nondecreasing and saturate at constant value). For example, the average path length (AFPL) rises slowly from mean internode distance (MID) approximately equal to k/2 (i.e., which corresponds to best possible performance), when the network is utilized lightly, 2* MID equal to k (it will be recalled that k is the diameter of the network), when the network is utilized heavily. These results are graphed in FIG. 10. In the worst case, a message takes approximately 2*k cycles/steps to reach its final destination as indicated in FIG. 11. Operation of the system is largely independent of lamda and optimal (i.e., O(k)) when the network reaches full capacity. This characteristic results from the flow out equal flow in property that holds at each node and the use of the send and receive queues to decouple the routing network from processing elements located at the network nodes. For example, for dynamic routing performance in a 2-D torus and a 2-D mesh network under SIMD (single instruction multiple data) operating mode, it has been found that: (1) the maximum number of network cycles required to accomplish a permutation in a n×n 2-D torus (i.e., a 2-D torus $n^2$ nodes) is less than or equal to (3/2) (n-1); and for any $(n+1)^2$ 2-D mesh, the system can achieve any permutation in at most 3(n-1) network cycles.

From the foregoing description, it will be apparent that there has been described a system for dynamic routing of messages in multinode networks which is especially adopted for use in parallel computer systems. The system eliminates flow control and queues in the routing nodes which is estimated to reduce the number of active elements and, therefore, simply the hardware design. Assuming that transistor logic is used, the improved system is estimated to result in approximately 60% less transistors than any static routing node with comparable performance. As noted above, flow control mechanisms are eliminated. Hot spots (bottlenecks and deadlocks are eliminated). The system is independent of network topology and may be used in multinode networks of various topologies; and the system performs efficiently for both SIMD and MIMD parallel computer organizations. While the system has been described for use in a parallel computer organization, it will be apparent that it is also useful generally in providing communication networks. The various examples and hardware implementations, as well as other applications for the herein described system, will undoubtedly suggest themselves to those skilled in the art. Accordingly, the foregoing description should be taken as illustrative and not in a limiting sense.

We claim:

1. In a multiprocessor in which messages are exchanged between processors interconnected for message communication by a multinode network wherein each node is connected to other nodes of said network by a plurality of message communication links, a system for transferring messages from nodes associated with processors which are the sources of said messages to nodes associated with processors which are the destinations for said messages so that said messages which are assigned priorities based on the topology of the network are passed continually among nodes without being blocked at any node and while minimizing the average time spent by messages in traveling between their source and destination nodes regardless of the distance in number of said links between said source and destination nodes, said system comprising non-blocking routing means for routing said messages at each node along links of minimal length to reach their destination nodes and along other links with priority given to the messages having longest distance between their source and destination nodes, said routing means including means based upon the present topology of the network, means at each node for increasing the priority of messages each time they are routed on links which are along paths of more than minimal length, and means at each node for receiving and then sending a number of said messages not exceeding the number of said plurality of links connected thereto.

2. The system according to claim 1 wherein said messages are generated by said processors with message weight data representing their priority and data representing their destinations and wherein said increasing means includes means in each node responsive to said message being transmitted from said node on a link which is along a path greater than of minimal length to its destination node for increasing the value of said message weight data.

3. The system according to claim 2 wherein said increasing means includes means for increasing the message weight thereof by two in numerical value.

4. The system according to claim 1 wherein said routing means includes means operative continually in consecutive cycles, and means for operating said transmitting and sending means so that said number of messages flow into and out of each of said nodes on each of said cycles.

5. The system according to claim 2 wherein said routing means comprises means for routing said messages in order of the value of their respective message weight data so that at each of said nodes the message of said number of messages having the highest message weight is routed for sending on a link along a minimal length path.

6. The system according to claim 5 wherein said routing means provides said routing in said weighting data value order with means for sorting and storing said number of data messages in accordance with their respective weighting data values.

7. The system according to claim 6 wherein said messages also contain data corresponding to the node in said network which is the destination thereof and said routing means includes means for allocating each of said messages to a different one of said links for sending said messages to other nodes of said network from said storing means in said weighting data order in accordance with said destination data thereof.

8. The system according to claim 7 wherein said allocating means comprises means responsive to said destination data for assigning each of said number of messages to be transmitted to (a) main links which are along paths of minimal length, (b) alternate links which are also along Paths of minimal length and (c) remaining ones of said lines which are available such that messages of highest weight order are assigned to said main link, and remaining messages are assigned to alternate and remaining available links respectively in accordance with their said weight data order.

9. The system according to claim 8 wherein said increasing means includes means responsive to the link to which said messages are assigned for increasing the value of the weighting order data only in those messages which are assigned to remaining available links.

10. A digital multinode message communication network which comprises a multiplicity of nodes, each having a plurality of message communication links which are not necessarily equal in number, said communication links connecting each of said nodes to a plurality of other nodes of said network, a routing system in each node which comprises means for receiving a plurality of messages which are assigned priorities based on the topology of the network and which is equal or less than the number of said links and sending said messages out along the links of each said node on successive routing cycles so that all said messages flow into and out of each said node on said successive cycles, nonblocking routing means for transferring messages which are received first on one of said plurality of links along a main path of minimum length in number of links, from said node to another of said plurality of nodes which is the destination thereof, then to another of said plurality of links along an alternate path which is also of said minimum length, and then to any of said plurality of links which is free in order according to the length of the path to said destination node of said message so that the messages having longer path lengths are given priority over messages of shorter path lengths to their respective destination nodes, said routing means including means based upon the present topology of the network.

11. The system according to claim 9 wherein said message contains a first control data field representing their destination nodes and a second control data field representing the priority thereof.

12. The network according to claim 10 wherein said control data field is a weight which has an initial value when said message one of said nodes which is the source of said message in said network which represents the minimal path from said source node to another of said multiplicity of nodes which is the destination of said message.

13. The network according to claim 11 wherein said routing means comprises means for incrementing the weight of each message which is routed to said free link.

14. The network according to claim 12 wherein said incrementing means includes means for incrementing said weight by a value of at least two.

15. The network according to claim 12 wherein said router means comprises means for sorting and storing said messages in order accordance with their weights, means for mapping said messages for routing on links of minimal length according to their first data fields representing the destinations thereof, and means for assigning said messages to said main, alternate and free links according to the weight thereof.

16. The network according to claim 14 wherein said means are provided for successively transferring said messages from said storing means to said mapping and assigning means in the order stored in said storing means.

17. The network according to claim 15 further comprising means associated with each of said nodes (a local node) for storing messages for which said node in the source node where said messages are injected with said network in send queues and for storing messages for which said local node is the destination of said messages in receive queues, and means for transferring said message into said routing system of said node in lieu of a message from another of said multiplicity of nodes when the destination of said message is said local node and when a message is not sent along to said local node along one of its plurality of links.

18. The system according to claim 1 wherein means are provided for routing said messages along those of said minimal length and other links which are not faulty.

19. The system according to claim 10 wherein said routing means include means for selecting links along said main, and alternate paths only if they are not faulty.

* * * * *